(12) United States Patent
Bergamaschi et al.

(10) Patent No.: US 11,846,543 B2
(45) Date of Patent: Dec. 19, 2023

(54) SINGLE PHOTON COUNTING DETECTORS IN STRIP OR PIXEL DESIGN HAVING DIGITAL INTER-PIXEL COMMUNICATION LOGIC COMPRISING A PHYSICAL AREA OF EACH PHOTO-DETECTOR DIODE BEING SUBDIVIDED INTO A PLURALITY OF SMALLER SECTIONS REPRESENTING A PLURALITY OF VIRTUAL CHANNELS

(71) Applicant: Paul Scherrer Institut, Villigen PSI (CH)

(72) Inventors: Anna Bergamaschi, Baden (CH); Bernd Schmitt, Lauchringen (DE); Roberto Dinapoli, Brugg (CH)

(73) Assignee: Paul Scherrer Institut, Villigen PSI (CH)

( * ) Notice: Subject to any disclaimer, the term of this patent is extended or adjusted under 35 U.S.C. 154(b) by 0 days.

(21) Appl. No.: 17/794,326

(22) PCT Filed: Jan. 19, 2021

(86) PCT No.: PCT/EP2021/051015
§ 371 (c)(1),
(2) Date: Jul. 21, 2022

(87) PCT Pub. No.: WO2021/148380
PCT Pub. Date: Jul. 29, 2021

(65) Prior Publication Data
US 2023/0053017 A1   Feb. 16, 2023

(30) Foreign Application Priority Data

Jan. 21, 2020 (EP) ..................... 20152785

(51) Int. Cl.
*G01J 1/44* (2006.01)
*H04N 25/772* (2023.01)

(52) U.S. Cl.
CPC .............. *G01J 1/44* (2013.01); *H04N 25/772* (2023.01); *G01J 2001/442* (2013.01)

(58) Field of Classification Search
CPC .... G01J 1/44; G01J 2001/442; H04N 25/772; H04N 25/77; G01T 1/247
(Continued)

(56) References Cited

U.S. PATENT DOCUMENTS 9,046,614 B2   6/2015 Schmitt
10,024,979 B1  7/2018 Viswanath et al.
(Continued)

FOREIGN PATENT DOCUMENTS

EP   2470927 A1   7/2012
EP   3021110 A1   5/2016

OTHER PUBLICATIONS

V. Di Trapani et al., "Characterization of noise and efficiency of the Pixirad-1/Pixie-III CdTe X-ray imaging detector", JINST, (2018), vol. 13, p. C12008.
(Continued)

*Primary Examiner* — Que Tan Le
*Assistant Examiner* — Mai Thi Ngoc Tran
(74) *Attorney, Agent, or Firm* — Laurence A. Greenberg; Werner H. Stemer; Ralph E. Locher

(57) ABSTRACT

A system counts photon interactions in an array of photosensitive diodes and addresses the issue of improving position resolution. Every photo-detector diode of the array is connected to a readout unit cell containing a high-gain charge-to-voltage amplifier, a shaper, at least two comparators with independent thresholds and at least one interpixel communication logic, receiving as input signals from comparator outputs of the same readout unit cell and of the neighboring readout unit cells. This logic is then connected to at least one counter, each counter followed by a counter
(Continued)

readout. By means of the digital interpixel communication logic and the set of comparators with different thresholds in every readout unit cell, it is possible to determine the photon hit position in the detector with a higher position resolution than the physical photo-detector size including the removal of the corner effect in pixel detectors.

7 Claims, 11 Drawing Sheets

(58) Field of Classification Search
USPC .......................................... 250/214 R, 208.1
See application file for complete search history.

(56) References Cited

U.S. PATENT DOCUMENTS

| 2012/0161016 A1* | 6/2012 | Schmitt ..................... G01T 1/17 |
| | | 250/370.06 |
| 2014/0166861 A1 | 6/2014 | Schmitt et al. |
| 2019/0025440 A1 | 1/2019 | Steadman Booker et al. |

OTHER PUBLICATIONS

Ballabriga, R. et al., "The Medipix3 Prototype, a Pixel Readout Chip Working in Single Photon Counting Mode With Improved Spectrometric Performance", IEEE Transactions on Nuclear Science, Oct. 2007, vol. 54, doi:10.1109/TNS.2007.906163, XP011194128.

* cited by examiner

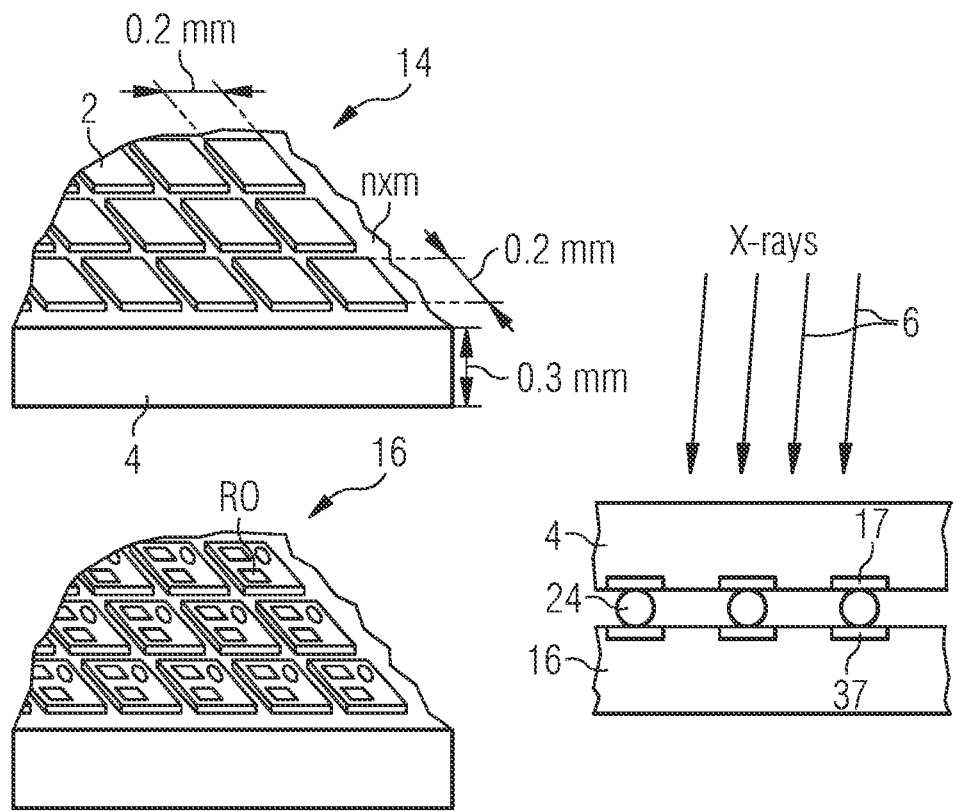
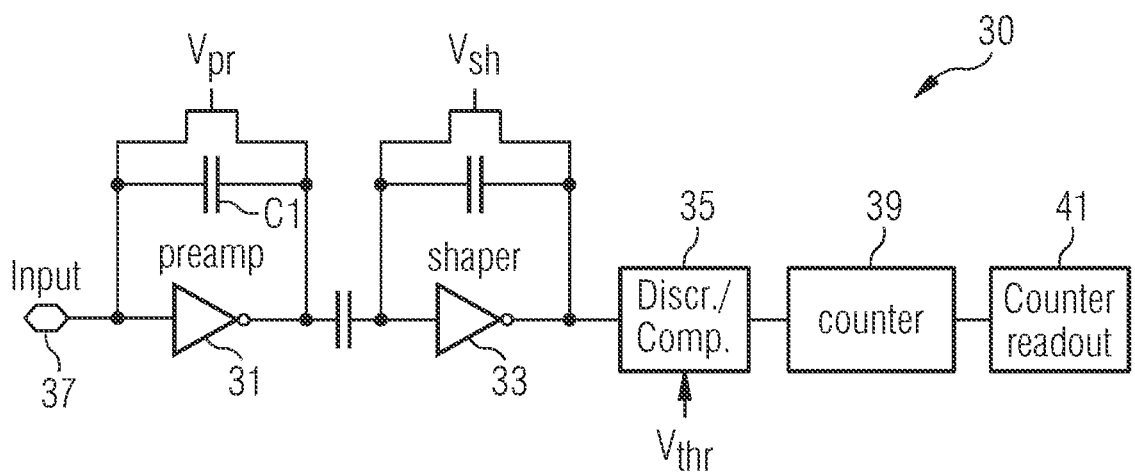

Charge sharing ⇩

Low resolution analog image ⇩

High resolution digital image

▭ Physical pixel grid, 110
— virtual pixel grid, 112

Electron entrance position

--- Electron path
▨ First hit
▩ Vetoed pixel

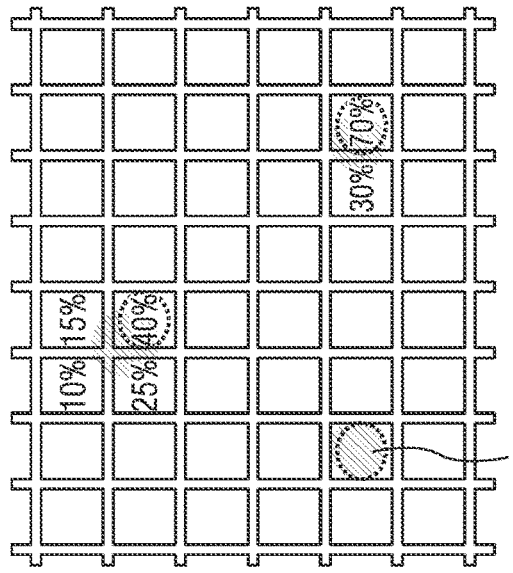
FIG 13A
Standard single photon counting one threshold set at 50%
3 photons, 2 counts
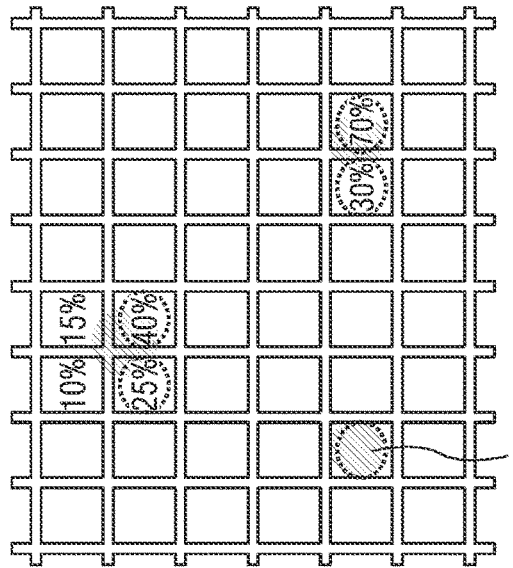
FIG 13B
Standard single photon counting however with one low threshold set at 20%
3 photons, 5 counts
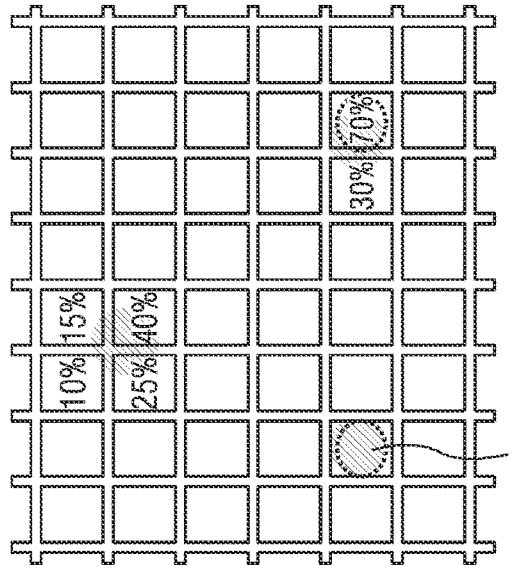
FIG 13C
Interpixel communication as in claim 4
3 photons, 3 counts
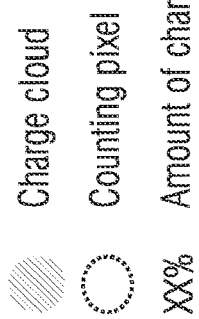
Charge cloud
Counting pixel
XX%   Amount of charge collected

SINGLE PHOTON COUNTING DETECTORS IN STRIP OR PIXEL DESIGN HAVING DIGITAL INTER-PIXEL COMMUNICATION LOGIC COMPRISING A PHYSICAL AREA OF EACH PHOTO-DETECTOR DIODE BEING SUBDIVIDED INTO A PLURALITY OF SMALLER SECTIONS REPRESENTING A PLURALITY OF VIRTUAL CHANNELS

FIELD AND BACKGROUND OF THE INVENTION

The present invention is related to a photon detection system having single photon counting capability.

Hybrid single photon counting detectors are widely used for a large number of synchrotron applications thanks to their high data quality, robustness and ease of use. Hybrid detectors are composed of two parts: the semiconductor sensor, containing an array of photo-detector diodes, also called sensor diodes, where the photon radiation is absorbed and converted into electric charge, and the frontend electronics, containing a corresponding array of readout unit cells, where the electric signal is amplified and digitized (see FIGS. 1 and 2).

1D hybrid detectors are called microstrip detectors, 2D are pixel detectors. 1D photo-detector diodes are often also called strips or microstrips, or, more precisely, sensor strips. Similarly, 2D photo-detector diodes are also called pixels or, more precisely, sensor pixels. A readout unit cell connected to its corresponding sensor diode is referred to as channel. When referring to strips or pixels we assume that they are connected to a readout unit cell and, similarly, when referring to readout unit cells we assume that they are connected to the sensor diodes.

In single photon counting detectors, the current signal generated by photons is amplified, shaped and compared with an adjustable threshold (see FIG. 1b). If the comparator fires, i.e. detects an input signal higher than its threshold, a counter is incremented. After a given time (exposure time) all the counters of the readout unit cells array are readout, delivering the required x-ray image. In this way, the electronic noise is mostly removed and the image quality is ideally only limited by the statistics on the number of counted photons.

The energy of a photon depends on the wavelength of the photon and the charge generated in the sensor is proportional to the photon energy. If we neglect Fano noise, photons of the same energy always create the same amount of charge, which is the photon energy divided by the energy needed to create an electron hole pair (e.g. 3.62 eV in silicon).

When referring to a comparator threshold in percent we understand that the comparator threshold voltage is set to a value which corresponds to the signal generated by a photon with this percentage of the photon energy.

There are two main limitations of single photon counting detectors: count rate limitations and charge sharing effects. Count rate limitations come from the fact that when two photons arrive in a very short interval of time they are counted as one photon due to pile-up effects (see U.S. patent application US 2014/166861A1).

Moreover, when a photon is absorbed in the semiconductor sensor layer, it creates a charge cloud, which due to diffusion and electrostatic repulsion of the charge carriers gets larger while drifting to the collecting electrode (valid for both types strip/pixel). For small pitches, the signal of a single photon can be partially collected by neighboring sensor diodes (see FIG. 2 and FIG. 5a). This effect is called charge sharing. Charge sharing is a problem in single photon counting detectors and prevents the development of small pitch detectors (to about 25 µm for strips and 50 µm for pixels). In addition, charge sharing reduces, at these small pitches, the achievable position resolution to values corresponding to larger pixels.

Several solutions have been implemented to suppress charge sharing and to restore the ideal pixel response both in space, given by the physical size of the pixel, and in energy, given by the total energy deposited by the impinging photon (see for example US patent applications U.S. Pat. No. 10,024,979 and US 2019/025440, the Pixirad ASIC: "Characterization of noise and efficiency of the Pixirad-1/Pixie-III CdTe X-ray imaging detector", V. Di Trapani et al 2018 JINST 13 C12008, or the Medipix3-CERN ASIC: "The Medipix3 Prototype, a Pixel Readout Chip Working in Single Photon Counting Mode With Improved Spectrometric Performance" by Ballabriga, R. et al., IEEE Transactions on Nuclear Science (Volume: 54, Issue: 5), October 2007).

While demanding applications in the area of photon science at synchrotrons are asking for smaller sensor diode sizes, these are currently still prevented in hybrid detector technology by charge sharing or by technological aspects like the required area for the electronics per readout unit cell in a readout chip or the interconnect technology between sensor and readout chip.

SUMMARY OF THE INVENTION

It is therefore the objective of the present invention to provide a photon detection system having single photon counting capability, a small pitch, a high photon count rate capability and a high frame rate, that is also capable of properly handling the charge distribution of a single photon over several neighboring channels.

This objective is achieved according to the present invention by the detector system for single photon detection, comprising:
  a) a layer of photosensitive material;
  b) an N×M array of photo-detector diodes arranged in said layer of photosensitive material; each of said photo-detector diodes having a bias potential interface and a diode output interface, said bias potential interface of each photo-detector diode being connected to a bias potential;
  c) an N×M array of high gain, low noise readout unit cells, one readout unit cell for each photo-detector diode; and
  d) each readout unit cell comprising:
    d1) an input interface connecting said diode output interface to a high-gain charge-to-voltage amplifier;
    d2) said high-gain charge-to-voltage amplifier being connected to a shaper;
    d3) said shaper being connected to at least a first comparator and a second comparator both having fixed or controllable comparator thresholds wherein the first comparator has a higher threshold than the second comparator;
    d4) at least one interpixel communication logic, receiving as input at least one of the comparator outputs of the same readout unit cell and at least one of the outputs of the comparators of at least one neighboring readout unit cell, said interpixel communication logic is then connected to at least one counter, each counter followed by a counter readout;

d5) said inter-pixel communication logic being configured using either global control signals or local control signals stored separately in each readout unit cell, and wherein:

d6) the physical area of the photo-detector diode is subdivided in a number of smaller sections, each one representing a virtual channel;

d7) the readout unit cell connected to said photo-detector diode comprises a number of counters at least equal to the number of virtual channels;

d8) the interpixel communication logic is enabled to increment the counter which corresponds to the virtual channel approximating better the photon impinging position, by evaluating at least the output of the first comparator of one of the readout unit cells and at least one of the outputs of the second comparators of at least one readout unit cell neighboring to the first one.

Thus, the present invention introduces an inter-pixel communication logic (note that this term is used both for pixel and strip detectors) which, by looking at the comparator outputs of several readout unit cells, is able to locate the position of the impinging photon with a precision higher than the sensor diode pitch. This allows sub-dividing the physical sensor diode into an array of virtual channels being represented by one or more counters in the respective readout unit cell. FIG. 11 shows schematically an example of subdividing a sensor diode into nine virtual channels. In order to use charge sharing in this beneficial way the charge sharing region has to cover a large part of the sensor diode area and therefore the sensor diode pitch has to be sufficiently small. The charge sharing region depends on the sensor material, the thickness and the applied sensor bias voltage. For silicon sensors with a thickness of 300 microns and typical bias voltages, the charge sharing region is in the order of about twenty microns.

For high-Z sensors (like GaAs, CdTe or CdZTe) the sensor thicknesses and charge sharing regions are typically significantly larger. The general goal is to achieve virtual channels with a pitch smaller than the physical sensor diode. Ideally, the virtual channels have all the same size. This invention is however not limited to this special case since many photon science applications profit significantly from smaller virtual channels even if the virtual channel size is not homogeneous.

To locate the position of an impinging photon, the inter pixel communication logic is connected to the comparator outputs of a certain number of neighboring readout channels. In the easiest case a photon hit within a central sensor diode towards a neighboring sensor diode is identified by a signal exceeding a first comparator with a high threshold in the central readout channel and a signal exceeding a lower threshold in a second comparator in the neighboring readout channel. A central photon hit in the central readout channel is identified by a signal exceeding the higher threshold of the first comparator and none of the neighbors having a signal exceeding a lower threshold of their second comparator. However, the invention is not limited to this simple case and it can make use of inter pixel communication and several comparators with independent thresholds in each readout channel to further increase the precision of the determination of the photon hit position.

The present approach allows to reach small virtual channel sizes for single photon counting hybrid detectors, and in particular pixel detectors, where this is otherwise not possible due to either the amount of charge sharing, the required readout unit cell area in the readout chip or other technological aspects like the available interconnect technology between sensor and readout chip (e.g. the bump bond technology causing a limit in the smallest possible pixel size).

In view of the foregoing, the present invention allows for a digital inter pixel communication logic that makes it possible to determine the photon position in the detector with a higher position resolution than the physical sensor diode size, since the second lower threshold in an adjacent readout unit cell eventually delivers the information that an incident photon has hit the border area of the respective sensor diode. Depending on the number of counters, the interpixel communication logic can be enabled to further identify which border area of the respective sensor diode has been hit. In case of using several thresholds in each readout channel, the interpixel communication logic can locate the photon position with an even higher precision allowing to subdivide the physical sensor diode into even more virtual channels.

Therefore, the readout unit cell comprises at least one second comparator wherein the first and the second comparator having fixed or controllable comparator thresholds and wherein the second comparator has a lower comparator threshold than the first comparator. The on-chip implementation of at least a second comparator per readout unit cell and the implementation of the interpixel communication logic, as proposed in this invention, creates the opportunity to logically evaluate the comparator outputs of a central readout channel and its neighbors in the digital part of the readout unit cells in order to determine the position of an incident photon at a higher resolution than the physical pitch of the sensor diode. In particular, the different comparator thresholds allow the evaluation of the signal of the firing comparators for the central readout channel combined with the outputs of the comparators having the lower threshold of at least one neighboring readout unit cell in order to identify whether a pixel has been hit centrally by the incident photon or towards the border area oriented to the neighboring sensor diode.

A preferred embodiment of the present invention can be achieved in the digital part of the readout unit cell if the interpixel communication logic is enabled to increment the first counter when the first comparator delivers a high output, preferably representing a logical "1", and all outputs of the second comparators of all connected neighboring readout unit cells deliver a low output, preferably representing a logical "0", and/or the interpixel communication logic is enabled to increment the second counter when the first comparator delivers a high output, preferably representing a logical "1", and the output of at least one of the outputs of the second comparators of at least one neighboring readout unit cell delivers a high output, preferably representing a logical "1", too. In other words, this logic says that the first counter is incremented when the first comparator having the higher threshold fires and none of the second comparator(s) of the adjacent readout unit cells fire thereby representing the count of a photon hit substantially central on the respective photo-detector diode. Accordingly, a photon hit in the border area of the same photo-detector diode is represented by incrementing the second counter when the first comparator having the higher threshold fires and the second comparator(s) of at least one readout unit cell adjacent to this border area cell fires, too. Suitably, the interpixel logic (25) can be configured to interpolate the photon hit position better than the photo-detector diode pitch (2), according to the following:

a) in case a central virtual channel is present (e.g. one central virtual channel and eight surrounding virtual channels per physical readout unit cell (RO) for pixel detector systems or one central virtual channel and two neighboring virtual channels per physical readout unit cell (RO) for strip detector systems), the interpixel communication logic (25) is enabled to increment a first counter (28b, 36a) when the first comparator (32) of the central readout unit cell (RO) delivers a high output, preferably representing a logical "1", and none of the outputs of the second comparators (34) of the connected neighboring readout unit cells delivers a high output, preferably representing a logical "0", and/or the interpixel communication logic (25) is enabled to increment one of the additional counters (28a, 28c, 36b to 36e), when the first comparator (32) in the central readout unit cell delivers a high output, preferably representing a logical "1", and the output of at least one of the outputs of the second comparators (34) of at least one neighboring readout unit cell delivers a high output, preferably representing a logical "1", too; and/or b) in case where a central virtual channel is not present (e.g. four virtual channels per physical readout unit cell (RO) for pixel detector systems and two virtual channels per physical readout unit cell (RO) for strip detector systems), the interpixel communication logic (25) is enabled to increment a predefined preferred counter (28b, 36a) of the readout out unit cell (RO) when the first comparator (32) delivers a high output, preferably representing a logical "1", and none of the connected second comparators (34) of the connected readout unit cells (RO) delivers a high output, while incrementing the additional counters (28a, 28c, 36b to 36e), when the value of at least one of the outputs of the second comparators (34) of at least one neighboring readout unit cell delivers a high output, preferably representing a logical "1".

This measure allows to introduce the concept of a central virtual channel being surrounded by a number of laterally disposed virtual channels, or in absence of a central virtual channel the concept of having the physical pitch of the photo-detector diode subdivided into a number of virtual channels, e.g. a square-shaped photo-detector diode is subdivided into four virtual channels (upper left, upper right, lower right, lower left in clock-wise designation).

In order to increase the resolution of a photon counting detector, a preferred embodiment of the present invention can provide for a photon detection system with the following features:

a plurality of interpixel communication logics or a single one having several outputs is realized per readout unit cell, wherein each of the interpixel communication logics are provided as input at least one comparator output of at least one neighboring readout unit cell. For example, in case of a pixel detector with square pixels, a central readout unit cell may have up to eight nearest neighboring readout unit cells and the interpixel communication logic of the central readout unit cell receives the output of at least one comparator of the central readout unit cell and the output of at least one comparator of the eight neighboring readout unit cells. The plurality of interpixel communication logics or the single one of each readout unit cell, will increment one or more counters in the same readout unit cell, each related to the absorption position of the photon in the sensor material.

One problem in single photon counting pixel detectors is the so-called corner effect where an incident photon hits a corner of a pixel, causing sharing of the charge cloud generated by the photon between two to four neighboring pixels depending on the exact photon absorption position. If a comparator threshold of 50% (typically used in single photon counting detectors to avoid double counts) is not exceeded in any of the four pixels of the corner, the photon is not counted introducing an inefficiency in all pixel corners. This effect is more pronounced in small pixels as the charge sharing area is a larger fraction of the pixel size.

In particular, to avoid this corner effect, a preferred embodiment of the present invention can provide for a photon detection system where a central readout unit cell is accompanied by eight neighboring readout unit cells and wherein the interpixel communication logic of a central readout unit cell links the output of a comparator with a lower threshold of the central readout unit cell and, in each corner, of the three neighboring readout unit cells adjacent to a corner of the central readout unit cell. In this way, although the signal of the photon is below 50% in all pixels and would be lost in a conventional single photon counting system, a photon can for example be detected if the low threshold of at least two of the comparators of the four pixels in a corner are exceeded. This implementation can either be used together with interpolation, e.g. having a virtual pixel in each corner of the physical pixel, or without interpolation in case of a single counter per pixel.

A minimal sensor diode size is required to have the largest part of the sensor diode area inside the charge sharing region at the sensor diode borders, what maximizes the position resolution. Specifically for readout unit cells having more than one comparator, and most of all in pixel detectors, an area efficient way to adjust the currents for the comparator threshold voltage is required, thereby also coping with the limited space available for the readout unit cells at small readout channel pitches.

Therefore, a further preferred embodiment of the present invention may comprise the following features:

the currents for the comparator thresholds of the comparators are generated off-channel, i.e. on-chip but out of the readout unit cell, by a totality of K current sources and wherein the currents for each comparator inside the readout unit cells are generated by linking the comparator to a controllable number of 0 to K of the off-channel current sources.

In order to enhance the count rate capability of the photon detection system, specifically with small sensor diodes, at high photon income, each readout unit cell may comprise a plurality of comparators but only a single counter with additional control logic incrementing this single counter by the number of comparators with a signal above the respective comparator threshold, wherein said comparators each have a different comparator threshold. In response to the rate of incident photons and the maximal number of expected counts per pixel, the variable thresholds of multiple comparators yield the possibility to optimize the count rate capability at high photon income and the use of a single counter allows to allocate all the necessary logic also in small size readout unit cells.

A preferred embodiment for photon science applications is a pixel detector with small pixels of about 50 microns or less with a single counter having both the count rate enhancement and the removal of the corner effect implemented.

For the detection of charged particles, in particular electrons, specifically in an energy range of 100 keV to 1 MeV in e.g. electron microscopes, multiple scattering of the electrons in the sensor and readout chips causes multiple hits of pixels for a single electron along its trajectory in the detector thus reducing the position resolution. This problem can be solved by suppressing hits in neighboring pixels along its trajectory for a short amount of time after a central pixel has been hit.

The suppression of hits in a neighboring pixel for electron detection can be achieved by a photon detection system that comprises a veto logic such that the first comparator firing inhibits counting in the adjacent pixels firing later for a given amount of time. Additionally, if the comparator in one of the adjacent pixels also fires, this pixel would not count but also veto counting in its neighbors and so on. In this way the pixels along the electron trajectory would be disabled and only the first pixel hit by the electron would count. This veto system can be implemented in an inter pixel communication logic which connects to the comparator output of its readout unit cell and to the comparator outputs and inter pixel communication logics of all the neighbors.

Further preferred embodiments of the present invention are listed in the remaining dependent claims.

Preferred embodiments of the present invention are hereinafter explained in more detail with reference to the attached drawings which depict in:

BRIEF DESCRIPTION OF THE FIGURES

FIG. 2 a schematic view of a part of a detector module comprising an array of photo-detector diodes as one of them is shown in FIG. 1;

FIG. 3 schematically the circuitry for single photon counting for a pixel of a detector system comprising an array of pixels with one comparator and one counter;

DETAILED DESCRIPTION OF THE INVENTION

Figure 1A:
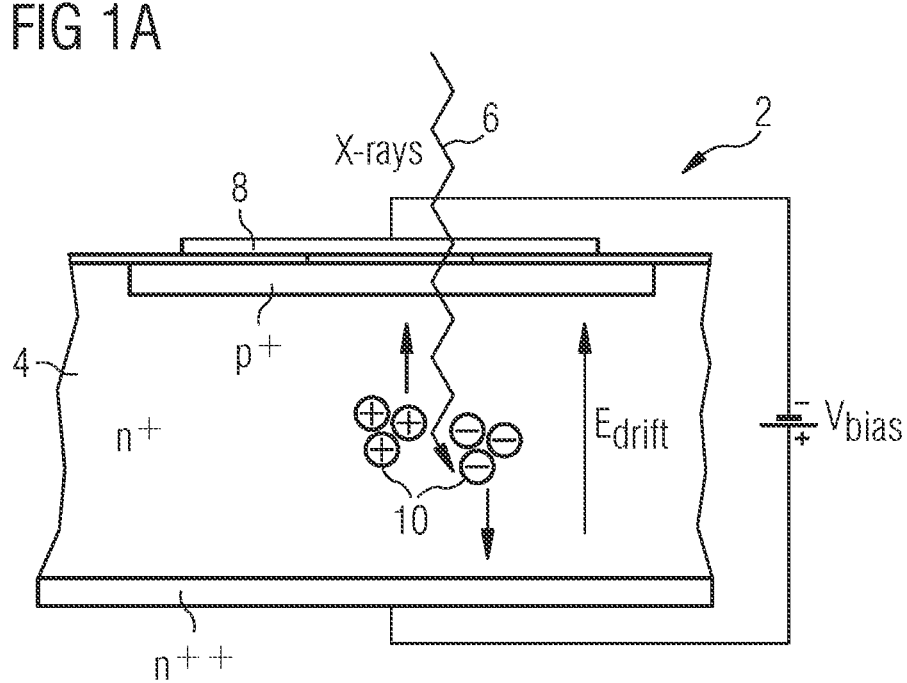
FIG. 1 schematically the basic concepts of a) hybrid semiconductor detection diode, and b) a comparator threshold applied to the analogue signal indicating the counts in a single photon counting detector.

FIG. 1a illustrates schematically the principles of a photo-detector diode 2 having a semiconductor trespassing section 4 with doping regions $p^+$, $n^+$, $n^{++}$ (all referred to as semiconductor sensor). The most commonly used material is silicon but also germanium, gallium arsenide, cadmium (zinc) telluride or other semiconductor materials with or without implants can be used. In case of monolithic detector systems, the sensor is directly implemented in the same layer as the readout electronics 16, in particular the readout unit cells RO.

An incident photon 6 having an energy in the range of few eV to few hundred keV before entering the semiconductor sensor ($p^+$, $n^+$, $n^{++}$ trespassing section 4), passes through a possible cover layer (e.g. aluminum) 8 and causes according to its energy and to the energy needed to create an electron hole pair a respective number of electron hole pairs 10 in response to the x-ray absorption. In the drawings, this number of electron hole pairs is exemplarily shown by three electron-hole pairs 10 being separated by the electrical field $E_{drift}$ generated by a source of bias potential $V_{bias}$.

Figure 1B:
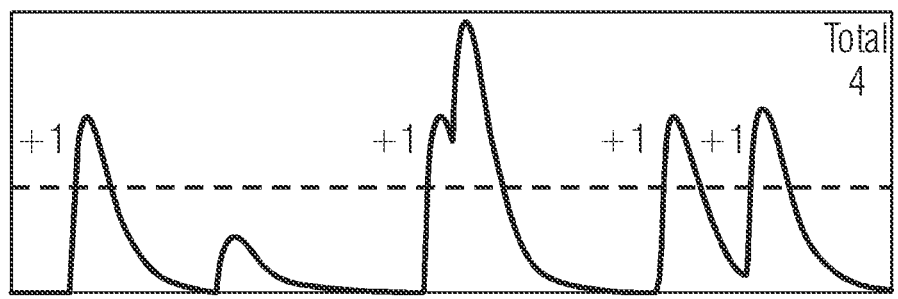

FIG. 1b) schematically shows the principle of the single photon counting system where the charge generated by an incident photon is counted as a hit when its signal exceeds a comparator threshold (comparator 42 with a threshold $V_{thr}$ in FIG. 3). In the example of FIG. 1b), a count of four incident photons is registered.

FIG. 2 shows a schematic view of a two-dimensional pixel sensor 14 having a number of photo-detector diodes 2 arranged in an array of N rows and M columns. The photo detector diodes 2 have typically a length and a width of about 10-500 μm and a height of about 20 μm to 2 mm. Below the plane of these photo-detector diodes 2 a readout chip 16 is arranged having a corresponding number of readout unit cells RO arranged for collecting the charge from the electron hole pairs 10 generated in the respective photo-detector diodes 2. The electrical connection between a diode output 17 interface of the photo-detector diodes 2 and an input interface 37 of the readout unit cell RO is achieved by bump bonding using for example indium or solder bumps 24.

In case of a one-dimensional detector (N or M equals 1) the connection between the diode output interface and the RO cell input interface can also be done with wire bonding. In case of monolithic detectors, the sensor diodes are implemented in the readout chip directly and no bump bonding is necessary.

FIG. 3 shows the prior art implementation of a single readout unit cell RO of a single photon counting detector. Each readout unit cell RO is connected through its input 37 to one photosensitive semiconductor diode 2 where the charge generated by an incident photon generates a voltage signal at the output of a charge sensitive preamp 31 according to the number of generated electron hole pairs 10. The maximum gain of the preamplifier 31 is determined by one or more feedback capacitors schematically represented as C1. The gain of the preamplifier 31 can be reduced, and its return to zero time decreased, by means of a feedback resistor in parallel to C1.

This FIG. 3 represents a standard single photon counting architecture 30 comprising the charge sensitive preamplifier 31 with the feedback capacitor C1 and optionally a variable feedback resistance implemented in CMOS with a FET and a variable voltage $V_{pr}$ controlling the gate of the FET.

The signal of the preamplifier 31 is amplified and filtered by a shaper 33. A comparator 35 connected to the output of the shaper 33 has a threshold voltage $V_{thr}$ which corresponds in the present example to about 50% of the signal generated by a photon of known energy, absorbed in the photosensitive semiconductor diode 2. If a photon arrives in a sensor pixel connected to the input 37 of the preamplifier 31, then the signal will go above the threshold of the comparator 35 and a digital counter 39 will be incremented accordingly. The count of the counter 39 is readout using a counter readout 41.

Figure 4:
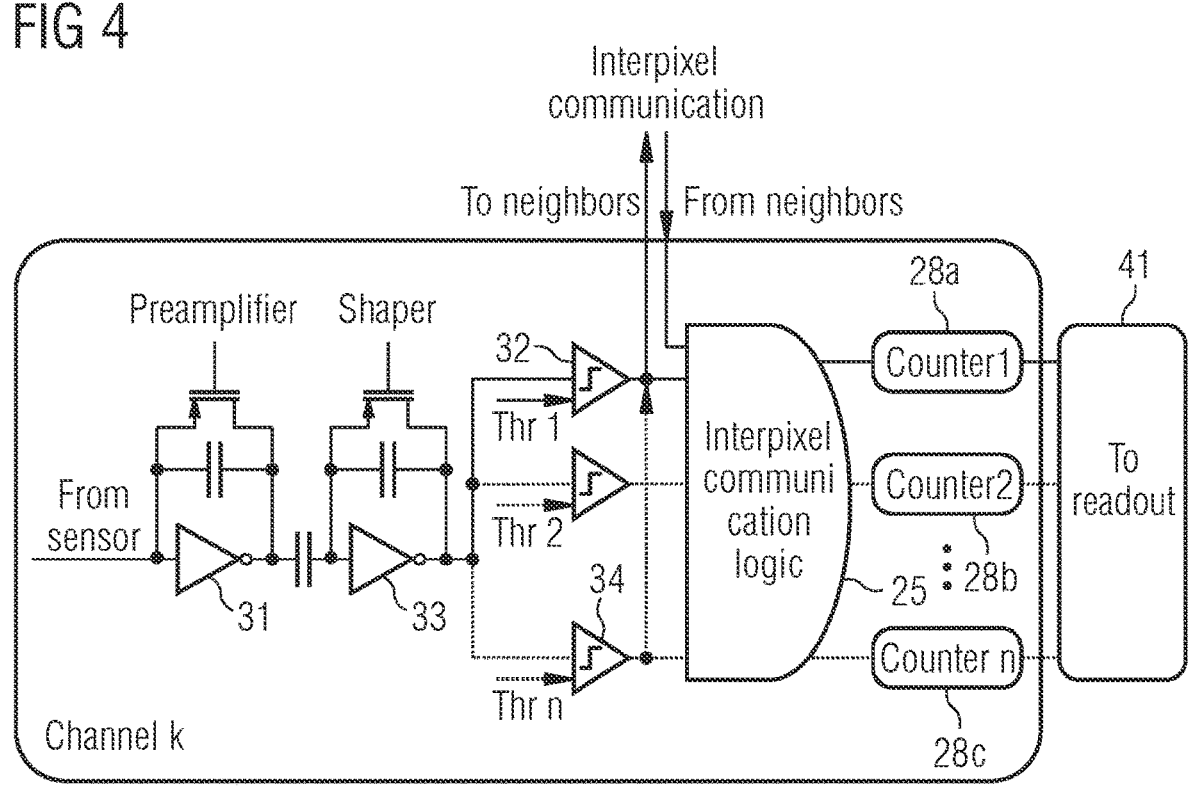
FIG. 4 schematically the concept of a single photon counting detector with at least two comparators, digital interpixel communication, interpixel communication logic and at least two counters.

FIG. 4 represents the general scheme of the proposed invention. The readout channel communicates to its neighbors using the digital outputs of one or more comparators 32, 34 and uses one or more comparators outputs from one or more neighbors in an interpixel communication logic. One or more of the outputs of this interpixel communication logic 25 increment one or more counters 28a, 28b, 28c and can then be read out and the data transferred outside of the readout cell by means of the counter readout 41.

The present invention discloses a new type of single photon detection system having a position interpolation logic that—compared to other detectors (e.g. Pixirad or the Medipix3—CERN ASIC)—has all the functionality implemented at the digital level of a respective readout unit cell RO. In particular, this interpixel communication logic 25 is placed after the comparators instead of using the analog signals as e.g. in Medipix3.

The examples according to following figures use multiple comparators with independent thresholds and a simple interpixel communication scheme between neighboring readout unit cells to interpolate between neighbors thanks to charge sharing. This allows the creation of virtual channels with a higher spatial resolution. As a result, a detector using this interpolation capability will have an effective virtual channel size, which is smaller than the physical sensor diode size.

Figure 5A:
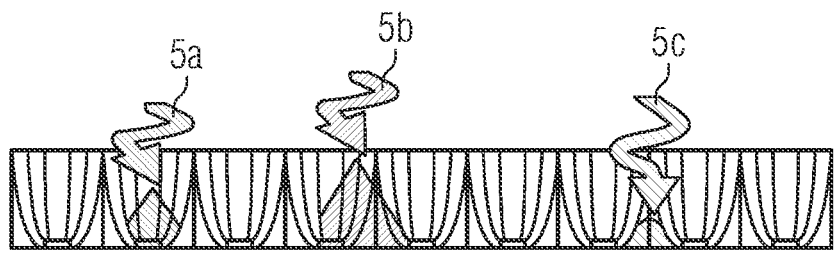
FIG. 5 schematically the basic concept of interpolation exploiting charge sharing in neighboring strips/pixels.
Figure 5B:
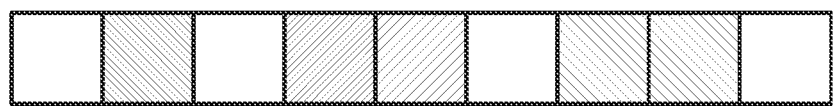
Figure 5C:
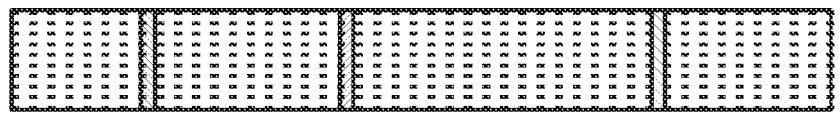

It has been already demonstrated (see European Patent Application EP 2 470 927 A1) that charge sharing can be exploited using an analog readout in order to improve the spatial resolution of the detector by applying centroiding algorithms. FIG. 5 shows schematically the basic concept of interpolation exploiting charge sharing. In this case, the interpolation is obtained offline using centroiding algorithms, while the present invention aims at performing interpolation in the pixel directly during data taking applying appropriate thresholds to the signals and exploiting digital interpixel communication.

In FIG. 5, the photons 5a, 5b and 5c represent the typical situations of a photon centrally hitting a sensor diode (5a), a photon laterally hitting a sensor diode (5b) and a photon hitting the sensor in between two sensor diodes (5c).

Similarly, energy resolved pixel detectors like Timepix could improve the spatial resolution when isolated photons are detected. However, in this case, the data from single photons detected must be processed off-chip in order to obtain the interpolated position. This limits the photon rate to below the pixel readout rate due to the requirement of having single isolated photons in an area of 3×3 pixels. This is typically below 1 kHz. In contrast, the present invention discloses a system to improve the position resolution on chip with count rates higher than 100 kHz per physical pixel.

In order to interpolate between neighboring pixels, a possible example disclosed here requires at least two comparators 32, 34 (see FIGS. 7, 8) per pixel as well as interpixel communication and interpixel communication logics 25 between neighbors.

In a first comparator 32 the comparator threshold can be set at 50% of the signal generated by the charge of an absorbed photon in the respective sensor diode 2 in order to detect if the photon 6 has been absorbed in that sensor diode 2. The second comparator 34 will have a lower comparator threshold to detect charge sharing among neighboring sensor diodes. In the central hit channel, the charge will exceed both thresholds while in the neighboring channel only the low threshold of the second comparator will be exceeded if the hit was close to that neighbor.

Therefore, the presence of a hit in the second comparator 34 with the lower threshold in a neighbor channel indicates that the photon 6 was absorbed close to that neighboring channel.

The implementation of the inter-pixel communication logic 25 is different for microstrip (1D) and pixel (2D) detectors.

Figure 6:
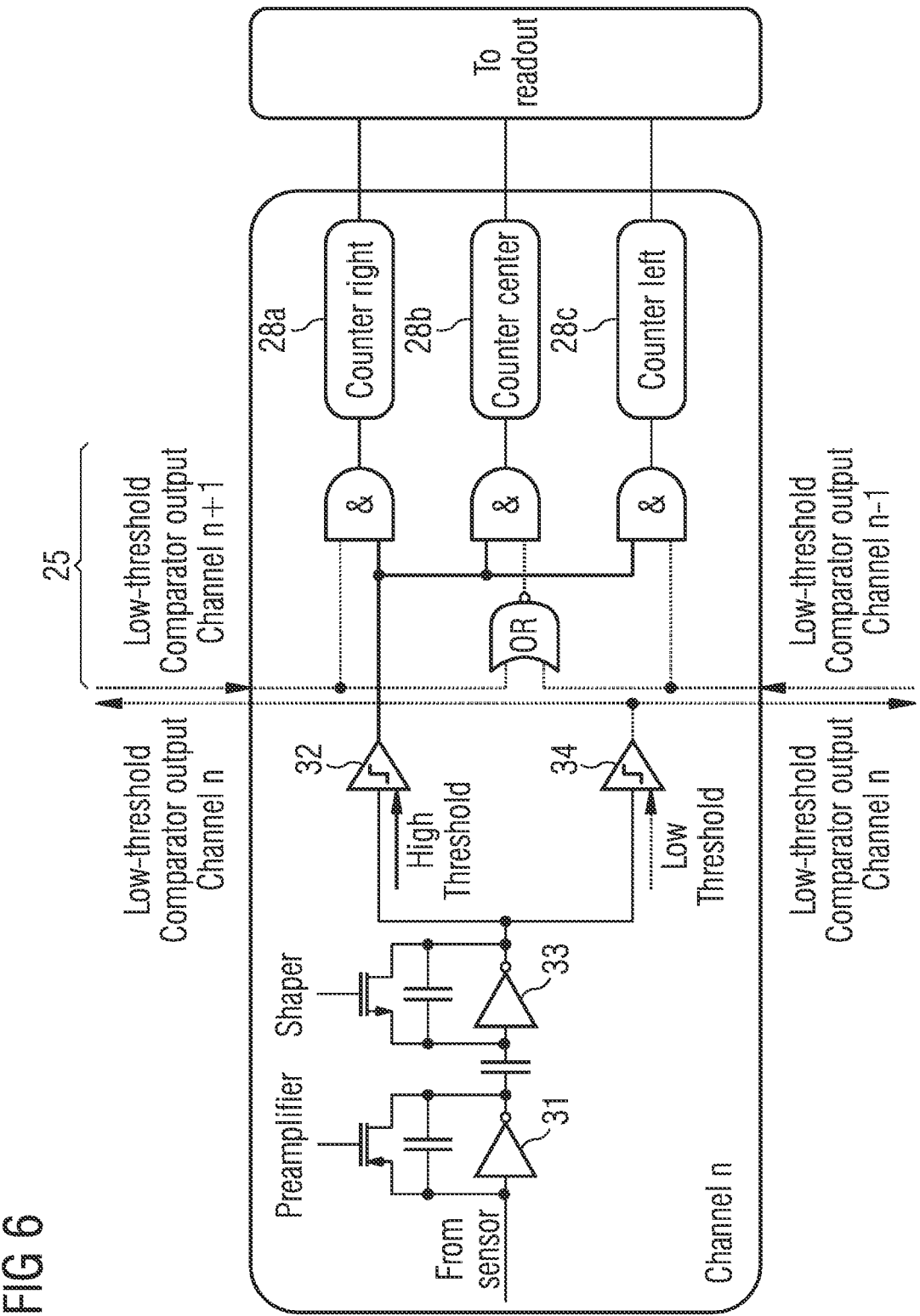
FIG. 6 schematically an implementation of the position interpolation logic for a microstrip detector.

FIG. 6 schematically shows how to implement three virtual channels with an effective spatial resolution better than the physical strip pitch in a microstrip detector. The amplified analog signal is sent to two different comparators 32, 34: the first comparator 32 has a high threshold at approximately half of the photon energy, while the second comparator 34 has a lower threshold chosen depending on the noise level of the detector. If the signal exceeds the high threshold, it will be counted either in a first counter 28a indicating a hit rather on the right side of the strip detector diode (channel n+1) or in a second counter 28b indicating a hit rather on the central part of the strip detector diode or in a third counter 28c indicating a hit rather on the left side of the strip detector diode (channel n−1) depending on the low threshold comparator outputs in the right and left neighbors. The interpixel communication logic 25 in this example are substantially AND-gates that receive as input the signal of the first comparator 32 of the central strip n and the second comparators 34 of one of the neighboring strips n+1, n−1. Only for the second center counter 28b, a NOR gate receiving the inputs from both second comparators 34 of the neighboring strips n+1, n−1 delivers one input for the AND-gate prior to the second center counter 28b. Generally spoken, the interpixel communication logic 25 therefore comprises a suitable number of logic gates, such as AND and NOR gates, in order to deliver the desired input to the respective counters.

Where the hit is actually counted, depends on the output of the low threshold second comparators 34 of the two neighbors (during the time that the high threshold comparator of the central channels remains high). If none of the low threshold comparators 34 of the neighbor channels n+1, n−1 fire, the photon will be counted by the second (central) counter 28b; if the low threshold second comparator 34 of the left channel n−1 fires, it means that the photon has been absorbed at the border with the left channel and it will be counted by the third (left) counter 28c; if the low threshold second comparator 34 of the right channel n+1 fires, it means that the photon has been absorbed at the border with the right channel n+1 and it will be counted by the first (right) counter 28a.

The effective channel size is determined by the choice of the low threshold. Depending on the strip pitch, it can be chosen in order to obtain equally distanced virtual channels, or, if this is not possible, as in case of strip pitches larger than 40 microns, adjacent side counters (e.g. the left counter of one channel with the right counter of its left neighbor) can be summed up, obtaining only two virtual channels per strip.

Figure 7:
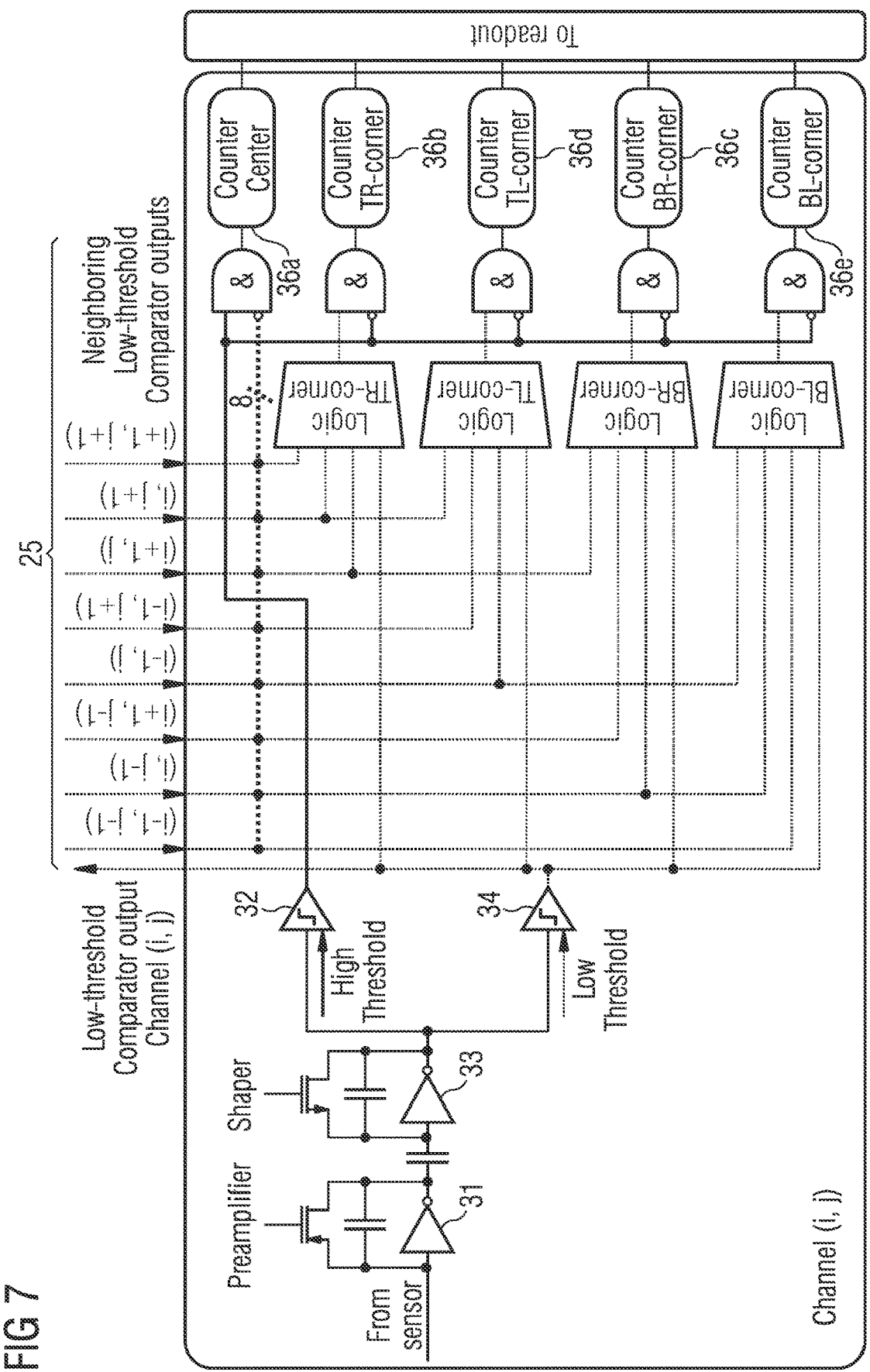
FIG. 7 schematically an implementation of the position interpolation logic for a pixel detector.

In the case of a pixel detector as shown in FIG. 7, the interpixel communication logic 25 in each readout unit cell RO relies on two comparators 32, 34: the first one with a high threshold usually at 50% of the photon energy and the second one with a low threshold, which is limited by the detector noise, but should be lower than 25% of the photon energy. The interpixel communication logic 25 needs to involve all eight neighbors of the central pixel. The number of counters may range between four and nine depending on the chosen combinatorial logic. FIG. 7 shows the connection necessary for subdividing the physical pixel into five virtual pixels corresponding to the center (counter 36a) and to the four corners (counter Top-Right 36b, counter Top-Left 36c, counter Bottom-Right 36d and counter Bottom-Left 36e).

The choice of the thresholds and of the combinatorial logic must avoid that photons are counted multiple times in different pixels. The side virtual pixels can be summed up with the adjacent side virtual pixels of neighbors in order to obtain equally spaced virtual pixels.

The combinatorial interpixel communication logic 25 for example for the counter Top-Right 36b representing a count in the upper right corner of a central pixel (i, j) requires that at least one of the second comparators 34 of the three neighboring pixels (i, j+1), (i+1, j+1) and (i+1, j) fire during the duration of the first comparator 32 of the central pixel (i, j) firing. Accordingly, a count for the lower right corner, the upper left corner and the lower left corner can be achieved with the respective combinatorial interpixel communication logic 25 as shown in FIG. 7.

The special case of a loss of a hit in a corner between pixels can be handled with an embodiment of the present invention as well. FIG. 13 shows what happens in case of square pixels (i.e. with four pixels involved in a corner hit) in case of a central hit 130, a border hit 132 and a corner hit 134, and where different counting schemes are implemented. FIG. 13a exemplifies what happens with the standard single photon counting approach, when the photon is counted if the charge collected in the pixel is more than 50%. A central hit 130 and a border hit 132 are correctly assigned to the pixels where most of the charge is collected, while a corner hit where none of the pixels has a charge above 50% is not counted, resulting in a loss of efficiency of single photon counting systems, specifically for small pixels. This effect is called corner effect and is a problem for example in diffraction experiments, where the diffraction peaks are much smaller than the pixel size (e.g. in protein crystallography) since in this case the number of counts strongly depends on the position of the peak within a pixel.

Another approach, shown in FIG. 13b, consists in reducing the photon detection threshold. This allows to detect all impinging photons but leads to a multiple counting of the same photon in different pixels. In this example both the border hit 132 and the corner hit 134 count the same photon twice.

This problem has been approached in the prior art by analog charge summation schemes, e.g. in the Medipix detector. A different approach is disclosed in U.S. Pat. No. 10,024,979 and is based on digital interpixel communication and discloses a method to mitigate charge sharing. The pixel logic is enabled, based on the output of an event detector and a coincidence detector, to trigger the on-pixel ADC which digitizes the output of the high gain-to-voltage amplifier. The output of the pixel ADC is then sent to an off-pixel anti-charge sharing circuitry which tries to recover the total energy and the pixel hit of the impinging photon. The use of an ADC will result in a longer processing time compared to purely the digital interpixel communication logic 25 realized according to the present invention. Additionally, due to the requirement of an event detection by one of the neighboring pixels, the system according to U.S. Pat. No. 10,024,979 would be able to reconstruct correctly the energy and the pixel hit by the photon for a border hit 132, but would fail to detect it in case of a corner hit 134 involving four pixels. The prior art system does also not increase the resolution beyond the physical sensor diode size which—to the contrary—is the specific aim of the present invention.

One preferred embodiment according to the present invention discloses an interpixel communication logic comprising interpixel communication between the four involved pixels in a corner only at the digital level therefore making the required circuitry smaller, simpler, faster and more robust against process variations.

This preferred example discloses how to overcome the loss of efficiency close to the pixel corners by implementing multiple comparators 32 and 34 with independent threshold and appropriate interpixel communication logic 25 among these four pixels.

Figure 8:
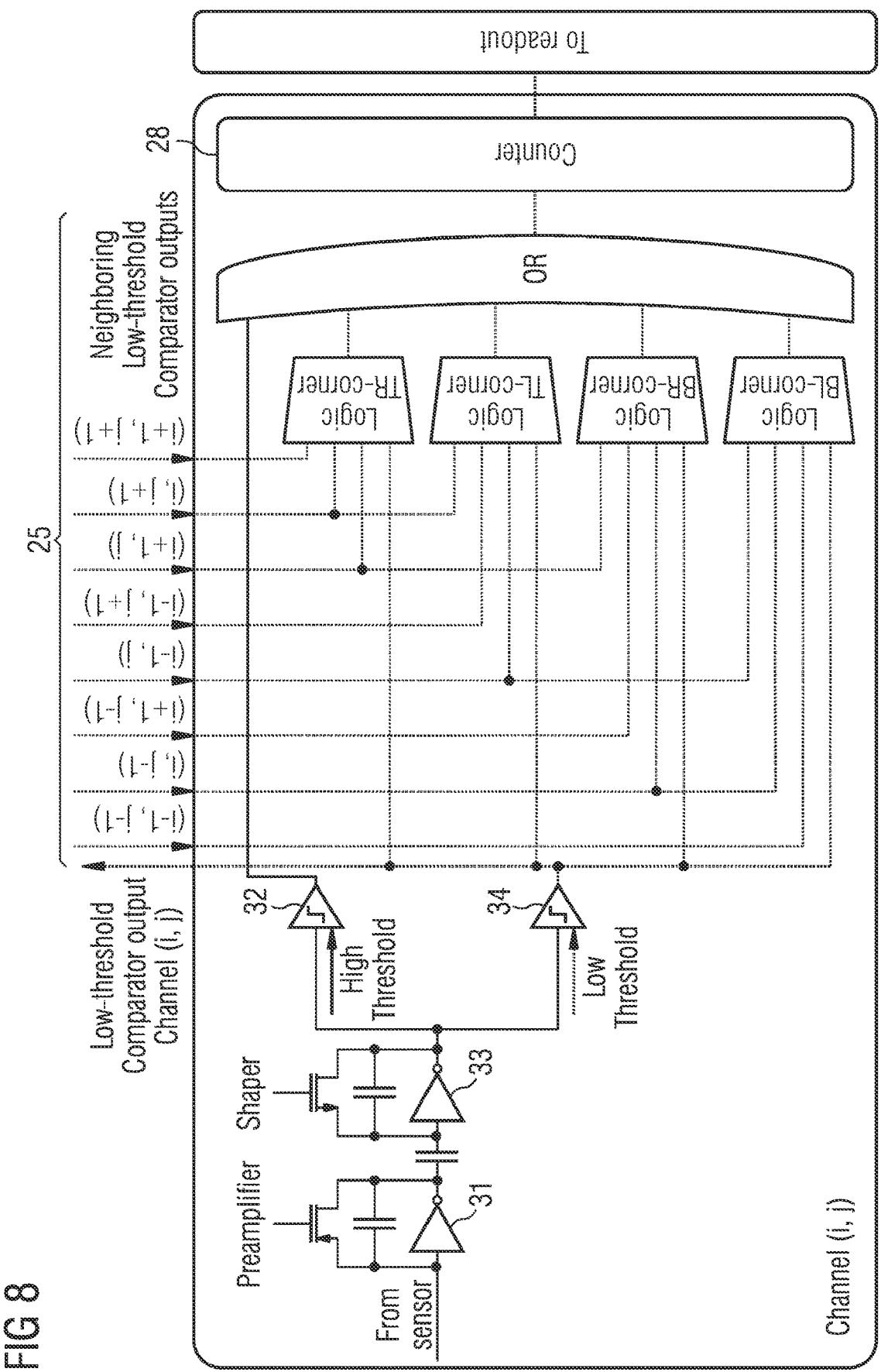
FIG. 8 schematically an implementation of the interpixel communication logic in order to avoid the corner effect in a pixel detector with one counter.

As shown in FIG. 8, in the case of a pixel detector, the interpixel communication logic 25 also relies on two comparators 32, 34 per pixel: the first one 32 with a high threshold usually at 50% of the photon energy and the second one 34 with a low threshold, limited by the detector noise, which should be lower or equal to 25% of the photon energy. The interpixel communication logic 25 needs to involve all neighbors of a central pixel (eight in case of a square pixel), as shown in FIG. 8. A photon is counted if the signal exceeds the high threshold or if multiple comparators 34 in the pixel corners fire simultaneously. Moreover, the combinatorial interpixel communication logic 25 is in charge of avoiding that a photon is counted multiple times in neighboring pixels. Similar to the interpolation, this effect can be detected by the low threshold (~25%) and the high threshold and by simultaneously using the second low threshold comparators 34 from the neighboring pixels. If no high threshold is met, but at least two low threshold comparators fire in neighboring pixels, a photon hit can be assigned to the central pixel.

Further, a preferred embodiment comprising area efficient Digital-to-Analog-Converters for fine-tuning (trimming) of the comparator thresholds is disclosed. In single-photon-counting detectors, a small DAC (usually 6 bits) is used in every channel for fine-tuning of every comparator threshold to obtain a more uniform response between the channels. This is of paramount importance in the present design, as a channel with a very low threshold with respect to the neighbors could strongly bias the correct detection of the virtual channel. In an architecture with several comparators per channel and small pixels, an area efficient way for the design of the DACs is required, since all comparators require independent trim bits which cannot fit in the small pixel area.

In existing designs, each comparator has its own DAC with its own array of current sources to form the current DAC. A more efficient design is to have a single array of current sources outside the detector matrix of the readout unit cells RO and to copy the currents of the different bits of the external current sources into the comparators of each individual pixels (or to a group of pixels). In this way, a lot of space can be saved in the detector matrix of the readout unit cells RO (one RO per pixel) especially in an architecture with several comparators 32, 34 requiring individual tuning.

In order to have a linear scaling of the bits, a current source is normally used multiple times according to the bit weight. For example, in systems with 6 trim bits the total number of transistors of the current sources is therefore 63 (bit 0 one current source, bit 1 two current sources, bit 2 four, bit 3 eight, bit 4 sixteen, bit 5 thirty-two).

In order to have a good uniformity, these transistors also need to be relatively big. In a system with three comparators one therefore needs already 189 relatively big FETs for the DACs in each pixel, which is impossible to fit in a small area pixel. Therefore, a more area efficient design is disclosed by implementing the DAC with the current source only once outside the readout unit cells (pixels) and by copying the currents in each readout unit cell (pixel).

In order to limit the space allocated for the current sources necessary to generate the comparator threshold adjustable on a channel-by-channel basis, the current sources are placed outside of the channel at the periphery of the detector chip. The currents are distributed then to all the comparators of all the readout unit cells of the detector. Separate subsets of current sources can be dedicated to different groups of comparators or to limited regions of the detector, in order to improve the uniformity of the currents.

For each bit of the individually adjustable threshold (usually 6 bits) a number of current sources equal to 2 elevated to the bit number is required. The currents generated for each bit are then copied to the pixels. One bus line per bit is required. Inside the pixel, each bit is then converted into a current and activated by a switch controlled by the digital adjustable bits in order to adjust the threshold individually for each comparator.

Another preferred embodiment of the present invention, also particularly useful in case of small area of the readout unit cell, provides for an enhancement of the count rate capability by optimizing the threshold on multiple comparators. In order to have optimal count rate capability of the detector system, the pulse shape and the thresholds in a multi threshold system have to be optimized to increase the count rate capability.

Single photon counting systems have count rate limitations at high photon rates (about 1 MHz per pixel) due to analogue pile up in the preamplifier 36. The count rate capability is usually improved by optimizing the pulse duration or by measuring the pulse duration (Time-over-threshold or retriggering capability). Additionally, previously a way of improving the count rate capability has been patented by the same applicant by tuning the analogue pulse shape and by counting the pile-up of photons using thresholds higher than the energy of single photons (see US patent application US 2014/166861 A1). In that patent application, the total number of counts was obtained as the sum of the counts of multiple comparators, each followed by its counter, with a threshold of 0.5, 1.5, 2.5 and so on.

Figure 9:
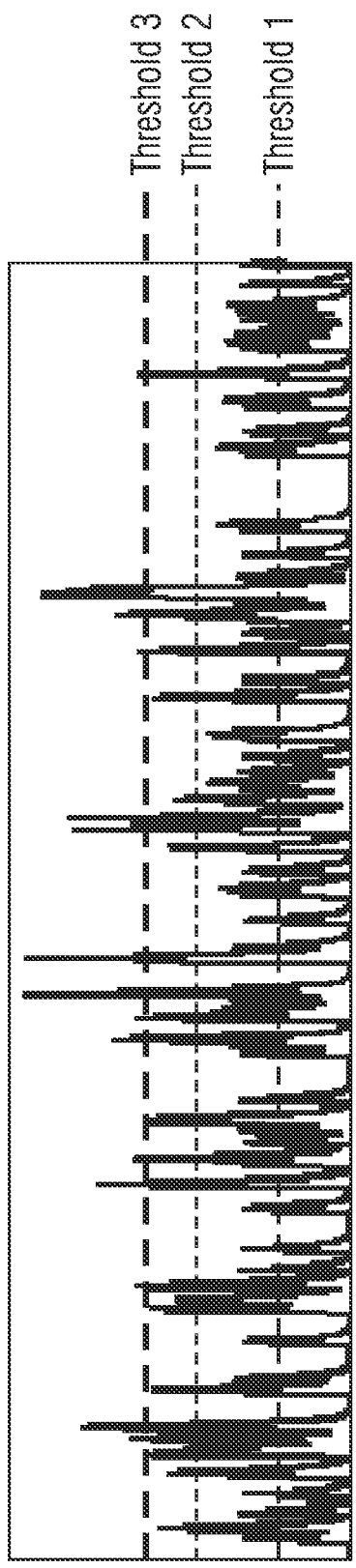
FIG. 9 schematically the usage of multiple thresholds to enhance the count rate capability at high photon income.

The use of multiple comparators 32, 34 with independent thresholds improves the count rate capability of a photon counting detector by detecting the pile up of the analog signal, as shown in FIG. 9. The choice of the thresholds can also be optimized depending on the shape of the analog signal.

One further preferred embodiment of the present invention with the multiple comparator concept discloses a count rate enhancement with multiple comparators 32, 34 and 40 and a single counter 28 only. This may apply for example for a pixel matrix having a very small pitch.

Figure 10:
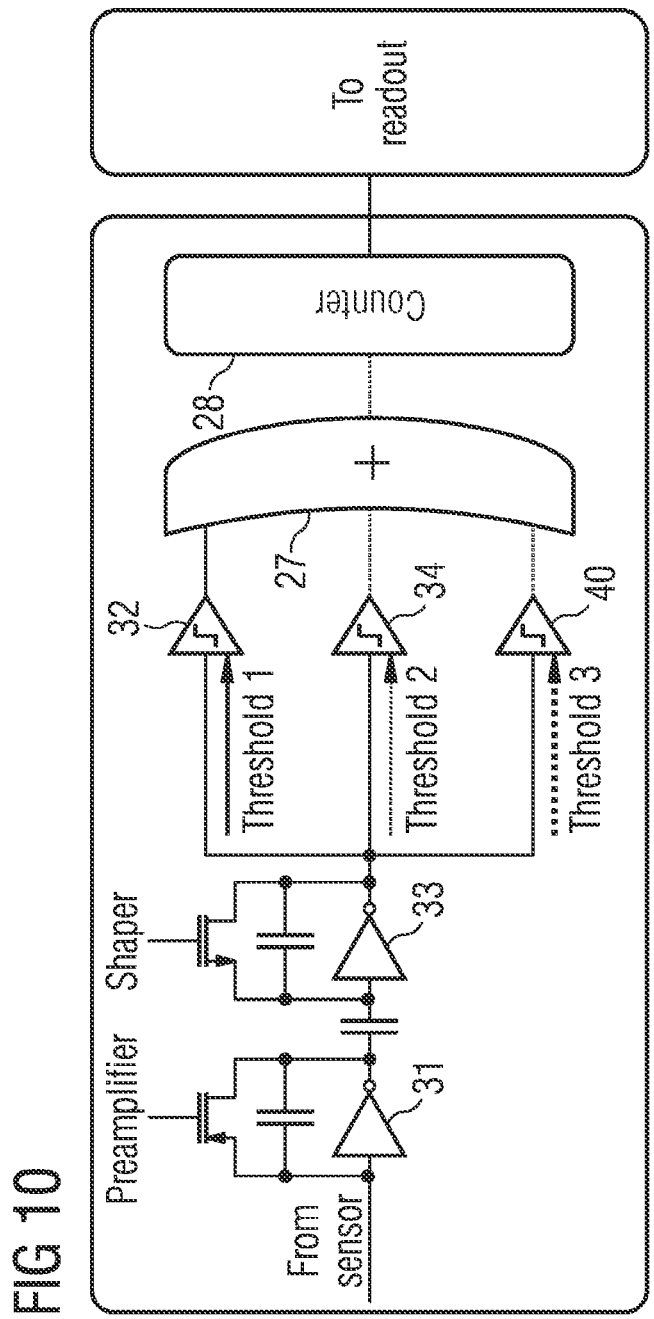
FIG. 10 schematically an enhancement of the count rate capability using multiple comparators and a single counter per readout unit cell.
Figure 11:
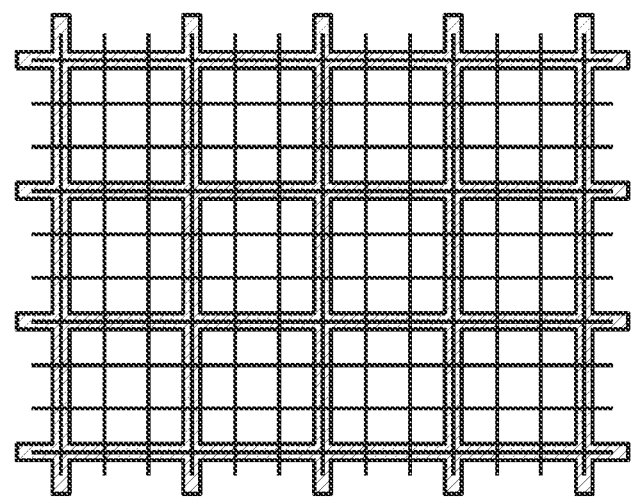
FIG. 11 example of subdivision of the area of a physical pixel in nine virtual sub-pixels.

If the pixel size does not allow the implementation of several counters in the pixel area, then the count rate enhancement using counting of pile up photons can still be implemented by implementing multiple comparators with different thresholds (e.g. 0.5, and additional higher values) and a single counter 28 only. The counter will be incremented here by an additional logic 27 by the number of comparators 32, 34, 40 for which the signal was above the threshold, in order to compensate for the pile up. As an example, the implementation of such an architecture for one channel of the detector with three comparators is shown in FIG. 10. It has to be noted that the principle here also works when just two or even more than three comparators are provided.

Another preferred embodiment of the present invention can provide for a suppression of neighbor hits for electrons detection (or charged particles detection in general). This detector has the same basic setup as explained for the photon detections earlier in this disclosure with respect to FIG. 3.

High energy electrons can scatter several hundreds of microns in the sensor and can be counted by multiple pixels. In order to obtain the entrance position of the electron, one can assign the electron to the pixel which first detects it. This has been done by detecting the time of arrival of isolated electrons (e.g. Timepix detector), or by vetoing neighboring pixels of the first pixel which detects a hit. The present embodiment implements it in hardware by vetoing counting of all the pixels belonging to the same electron track for a given amount of time after one pixel has fired.

In order to avoid multiple hits for a single electron scattering among several pixels, a veto logic is implemented such that a comparator firing inhibits counting by the adjacent pixels firing later for a given amount of time.

This veto logic comprises an interpixel communication among a number of the neighboring pixels such that the first pixel which detects a hit generates a veto signal that inhibits the counting of the neighboring pixel for a given time slot. This time slot for the veto logic needs to be optimized depending on the charge collection time and on the analog decay time of the signal.

Additionally, the interpixel logics 25 of the adjacent pixels which have been vetoed are enabled to transfer the veto signal to their neighboring pixels in case at least one of their comparators is detecting a signal above threshold. The process continues vetoing neighbors of neighbors until the veto signal reaches a pixel where no charge was detected. As a result, only the first pixel firing, which should correspond to the entrance position of the electron, will increment the counter, resulting in an improved spatial resolution.

Figure 12:
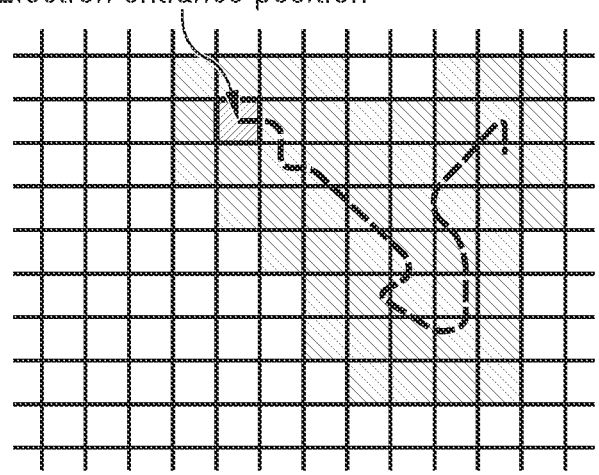
FIG. 12 example of the response of the readout unit cells in case an electron impinges on the sensor pixel and undergoes multiple scattering, when the veto chain logic is implemented, and FIG. 13 example of the counting behavior of the readout unit cells in case of photons impinging in different zones between pixels, and in case of different counting schemes.

An example is shown in FIG. 12. The electron is impinging on the dark-grey entrance pixel 124, which detects a first hit. All neighboring pixels of 124 are vetoed (light gray pixels 126).

The electron continues along its electron path 122, in a pixel 123 neighboring to 124, which also detects charge. Due to the coincidence of the veto signal coming from 124 not only 123 does not increment its counter, but it also forwards the veto signals to all its neighbors. This goes on from pixel to pixel, following the electron track, until no more charge is detected.

The invention claimed is:

1. A photon detection system for single photon detection, comprising:
   a layer of photosensitive material;
   an N×M array of photo-detector diodes disposed in said layer of photosensitive material, each of said photo-detector diodes having a bias potential interface and a diode output interface, said bias potential interface of each of said photo-detector diodes being connected to a bias potential, a physical area of each of said photo-detector diodes being subdivided in a plurality of smaller sections and representing a plurality of virtual channels where each of said smaller sections representing a virtual channel;
   an N×M array of high gain, low noise readout unit cells, one of said high gain, low noise readout unit cells provided for each of said photo-detector diodes, each of said high gain, low noise readout unit cells containing:
   a high-gain charge-to-voltage amplifier;
   an input interface connecting said diode output interface to said high-gain charge-to-voltage amplifier;

a shaper connected to said high-gain charge-to-voltage amplifier;

comparators having outputs including at least a first comparator and a second comparator both having fixed or controllable comparator thresholds, wherein said first comparator has a higher threshold than said second comparator, said shaper being connected to said first and second comparators;

at least one interpixel communication logic, receiving as an input at least one output of said first and second comparators of a same one of said high gain, low noise readout unit cells and at least one of said outputs of said first and second comparators of at least one neighboring said high gain, low noise readout unit cell;

counters, said at least one interpixel communication logic is connected to said counters;

a counter readout connected to said at least one counter;

said at least one inter pixel communication logic being configured using either global control signals or local control signals stored separately in each of said high gain, low noise readout unit cells;

said high gain, low noise readout unit cell connected to said photo-detector diode contains a number of said counters at least equal to a number of said virtual channels; and said at least one interpixel communication logic being enabled to increment a counter of said counters which corresponds to said virtual channel approximating a photon impinging position, by evaluating at least said output of said first comparator of a first one of said high gain, low noise readout unit cells and at least one of said outputs of said second comparator of at least one of said high gain, low noise readout unit cells neighboring to said first one of said high gain, low noise readout unit cells.

2. The photon detection system according to claim 1, wherein said at least one interpixel logic is configured to interpolate the photon impinging position better than said photo-detector diode, wherein:

in a case where a central virtual channel is present, said at least one interpixel communication logic is enabled to increment a first counter of said counters when said first comparator of a central readout unit cell of said high gain, low noise readout unit cells delivers a high output, and none of said outputs of said second comparators of connected neighboring said readout unit cells delivers a high output, and/or said at least one interpixel communication logic is enabled to increment an additional one of said counters, when said first comparator in said central readout unit cell delivers a high output, and said output of said second comparator of at least one said neighboring readout unit cell delivers a high output; and/or in a case where said central virtual channel is not present, said at least one interpixel communication logic is enabled to increment a predefined preferred counter of said counters of said high gain, low noise readout out unit cell when said first comparator delivers a high output, and none of said connected second comparator of said connected neighboring readout unit cells delivers a high output, while incrementing said additional counters, when a value of at least one of said outputs of said second comparator of at least one neighboring said readout unit cell delivers a high output.

3. The photon detection system according to claim 1, wherein the photon detection system is enabled to reduce an efficiency loss due to a pile-up of photons and save an area required by multiple ones of said counters and their corresponding counter readouts using at least two of said comparators, with one comparator threshold set at half of a photon energy and another comparator thresholds set at various energies higher than the photon energy, and wherein said at least one interpixel communication logic is configured as in-pixel summing logic, such that every comparator of said comparators delivering a high output increments a same said counter.

4. The photon detection system according to claim 1, further comprising a photon counting pixel detector system enabled to reduce a loss of efficiency for photons absorbed in corners of said photo-detector diodes by means of:

said at least one interpixel communication logic being between a central readout unit cell of said readout unit cells and neighboring said readout unit cells;

said first and second comparators; and said at least one interpixel communication logic is enabled to increment one counter of said counters in said central readout unit cell, when:

said first comparator in said central readout unit cell delivers a high output; or in at least two of four of said readout unit cells being pixels in the corner, and one said second comparator delivers a high output and in none of said four pixels in the corner said first comparator exceeds the higher threshold.

5. The photon detection system according to claim 1, further comprising a plurality of off-pixel reference current sources; and wherein an area of said readout unit cell is limited and currents for an adjustment of a threshold of said comparators are generated out of said high gain, low noise readout unit cell by a totality of K of said off-pixel reference current sources and wherein the currents for each of said comparators are generated by linking a comparator to a controllable number of 0 to K of said off-pixel reference current sources.

6. The photon detection system according to claim 1, wherein:

said at least one interpixel communication logic is configured to receive information from any of its adjacent said high gain, low noise readout unit cells and is enabled to transfer the information to some or all said adjacent high gain, low noise readout unit cells;

said at least one interpixel communication logic is configured to generate a veto signal such that a comparator firing in said high gain, low noise readout unit cell inhibits counting, for a given amount of time, of some or all of adjacent said high gain, low noise readout unit cells; and said at least one interpixel communication logic of said adjacent high gain, low noise read out unit cells are enabled to transfer a veto signal to neighboring said high gain, low noise readout unit cells in case at least one of said comparators detect a signal above the threshold.

7. The photon detection system according to claim 2, wherein:

said central virtual channel is surrounded by eight said virtual channels per physical said high gain, low noise readout unit cell for pixel detector systems or one said central virtual channel and two neighboring said virtual channels per physical said high gain, low noise readout unit cell for strip detector systems; and when said central virtual channel is not present there are four said virtual channels per physical said high gain, low noise readout unit cell for pixel detector systems and two said virtual channels per physical said high gain, low noise readout unit cell for strip detector systems.

* * * * *